Patented Aug. 21, 1928.

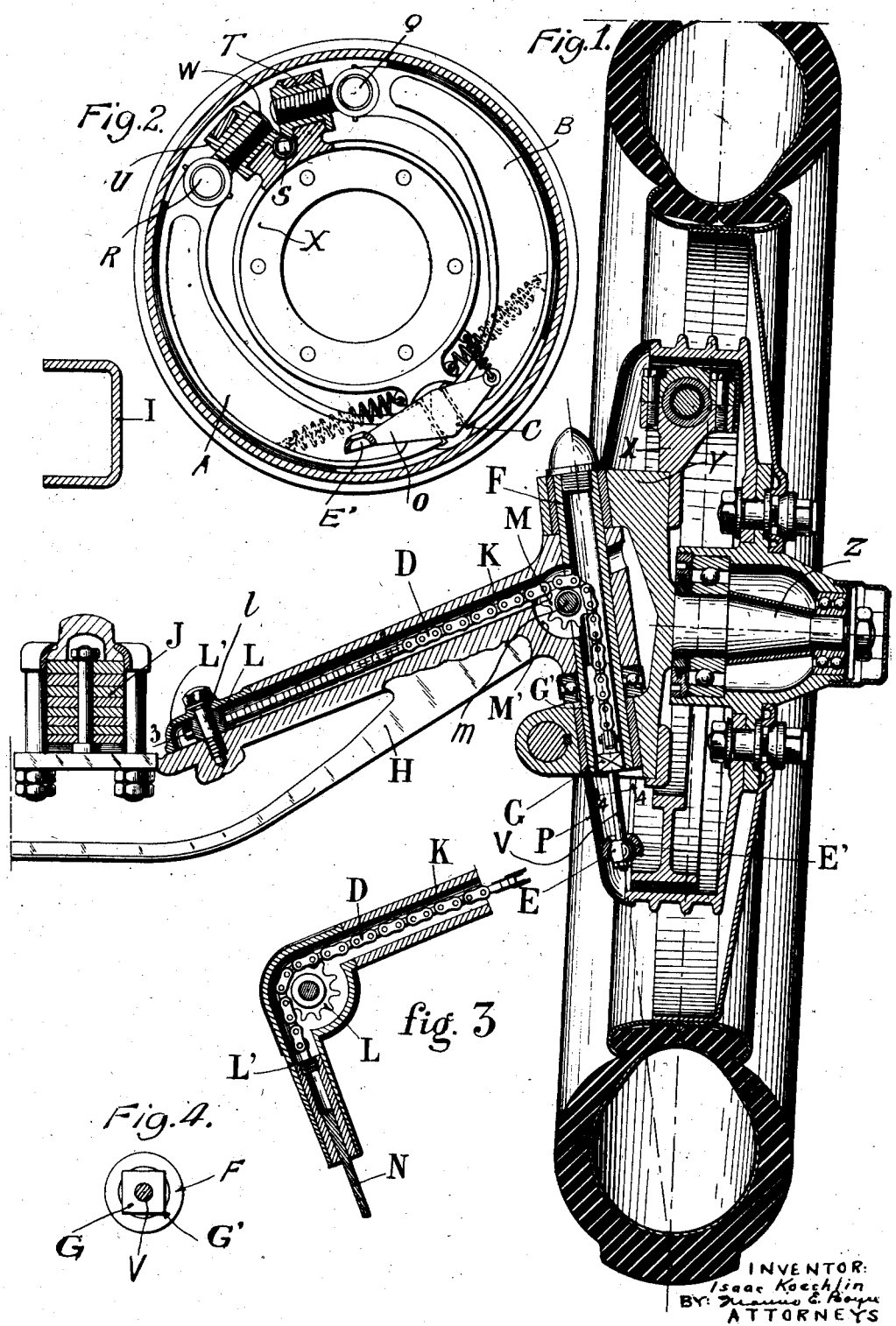

1,681,348

UNITED STATES PATENT OFFICE.

ISAAC KOECHLIN, OF LEVALLOIS-PERRET, FRANCE, ASSIGNOR TO SOCIÉTÉ ANONYME DES AUTOMOBILES ET CYCLES PEUGEOT, OF LEVALLOIS-PERRET, FRANCE.

STEERING-WHEEL BRAKE.

Application filed February 14, 1925, Serial No. 9,074, and in France March 31, 1924.

Various methods have been proposed for the control of brakes which are mounted upon the front or rear steering wheels of motor or like vehicles. But these methods are subject to drawbacks consisting chiefly in a more or less complicated mechanical construction and the use of numerous parts which require an accurate adjustment and which cannot always be properly protected against dust and grit.

The present invention has for its object an arrangement for the control of steering wheel brakes of the type which comprises a flexible traction member such as a band, cable chain or the like, extending through the tubular kingpin of the steering swivel of the wheel. According to the invention, said flexible traction member is connected at one end by a ball-and-socket joint with the lever controlling the braking members, and at the other end, which preferably extends through a longitudinal bore of the vehicle axle, with the transmission gear operated by the driver's lever or pedal.

Further characteristic features of the invention will be set forth in the following description with reference to the appended drawings which are given by way of example, showing an embodiment of the said invention.

Fig. 1 is a vertical section on the axis of the vehicle axle and of the wheel.

Fig. 2 is a section at right angle to the axis of the brake drum showing the braking members and the operating lever in side elevation with some parts in section.

Fig. 3 is a partial section on the line 3—3 of Fig. 1.

Fig. 4 is a partial section on a larger scale on the line 4—4 of Fig. 1, showing the square head G and the hollow swivel F in plane view.

As shown in the drawings, the vehicle axle H which is connected with the longitudinal chassis frame bar I by the springs J has formed in its end portion a longitudinal bore K which extends through a bored-out part or recess intended to receive the kingpin F of the steering swivel Z, the latter being mounted in the usual manner by means of its knuckle Y.

A sprocket L is pivoted on a pivot pin $l$ screwed upon the upper surface of the axle H at the inner end of bore K and a sprocket M is pivoted on a pivot pin $m$ extending horizontally through a recess M' provided at the end of bore K and opening into the vertical bore for the kingpin F. The latter is suitably slotted in order to allow the sprocket M projecting into the axial bore of kingpin F. Sprocket L is covered by a protecting case L' attached to the upper part of the vehicle axle.

A traction member D extends through the bore K and passes upon sprockets L and M. For this purpose, it is constituted by two portions of chains whose links are respectively adapted to engage the sprockets L and M and which are attached together at a point intermediate the sprockets. The inner end of chain D is attached, beyond the wheel L, to a cable N (Fig. 3) which is connected to the brake control pedal or lever. The other end of the chain which extends through the hollow kingpin F is attached to a square head G which is slidable within the kingpin F, the latter having the cross section shown in Fig. 4, that is four axially extending grooves corresponding to the four lateral edges $G^1$ of square head G; this obviates all torsion of the chain within the kingpin F when the steering wheel is swivelled in either direction.

The brake is for example a shoe brake in which the shoes A and B are operated by a cam C which is under the control of a lever O provided with a return spring. At the end of the said lever is provided a hemispherical bearing socket E' situated upon or adjacent the axis of the kingpin F, said socket co-operating with a ball E rigidly connected to the member G by means of a small rod V.

By the said arrangement, the traction exercised on the said chain by means of the cable N will be imparted to the lever O through the medium of the ball portion E, irrespectively of the position of the wheel about its kingpin F and without exercising any torsion upon the traction member D. The whole arrangement is protected against dust and grit by a simple casing of cast or pressed metal P.

The braking pressure may be adjusted by changing the length of the cable N, but I prefer to displace the pivoting pins Q and R of the shoes A and B in the manner described in my U. S. patent application Serial No. 9073, filed February 14, 1925. For this purpose each pivot pin Q, R has mounted thereon a threaded member W engaging respective nuts T and U having inner screwthreads of reverse directions and provided with an outer helical gearing in meshing engagement with an adjusting screw S. Screw S and nuts U and T are rotatably supported within a common support X secured to the knuckle Y of the swivel Z.

Obviously, the said invention is not limited to the constructional arrangements hereinbefore set forth which are given solely by way of example and which are susceptible of various modifications without departing from the principle of the invention.

Having now described my invention what I claim as new and desire to secure by Letters Patent is:

1. In a steering wheel brake the provision of a tubular kingpin for the steering swivel of the wheel, a flexible traction member extending longitudinally through said tubular kingpin, means for connecting one end of said traction member to the transmission gear operated by the driver, a sliding block connected to the other end of said flexible member and cooperating with the inner surface of said tubular kingpin whereby said sliding block may be displaced longitudinally but is prevented from turning in said kingpin, a rigid member integral with said sliding block, and a ball and socket connection between the end of said rigid member and the operating member for the braking members.

2. In a steering wheel brake the provision of a tubular kingpin for the steering swivel of the wheel, a flexible traction member extending longitudinally through said tubular kingpin, means for connecting one end of said traction member to the transmission gear operated by the driver, a polygonal sliding block connected to the other end of said flexible member and cooperating with a corresponding polygonal guide formed on the inner surface of said kingpin, a rigid member integral with said sliding block and a ball and socket connection between the end of said rigid member and the operating member for the braking members.

3. With a steering wheel brake, a vehicle axle having a longitudinal bore adjacent the wheel, a hollow kingpin for the steering swivel of the wheel and a flexible traction member extending longitudinally through the bore of said vehicle axle and said kingpin, and adapted to be connected to the transmission gear operated by the driver and to the operating member for the braking members.

In testimony whereof I have signed my name to this specification.

ISAAC KOECHLIN.